United States Patent
Vilrokx et al.

(10) Patent No.: US 9,602,993 B2
(45) Date of Patent: Mar. 21, 2017

(54) AUTONOMOUS EVENT COMMUNICATION USING WEARABLE EMERGENCY RESPONDER EQUIPMENT

(71) Applicant: Oracle International Corporation, Redwood Shores, CA (US)

(72) Inventors: Mark Vilrokx, San Mateo, CA (US); Anthony Siu-yip Lai, Redwood City, CA (US); Noel Portugal, Cedar Park, TX (US); Yuhua Xie, Walnut Creek, CA (US)

(73) Assignee: Oracle International Corporation, Redwood Shores, CA (US)

( * ) Notice: Subject to any disclaimer, the term of this patent is extended or adjusted under 35 U.S.C. 154(b) by 190 days.

(21) Appl. No.: 14/476,643

(22) Filed: Sep. 3, 2014

(65) Prior Publication Data

US 2015/0256990 A1    Sep. 10, 2015

Related U.S. Application Data

(60) Provisional application No. 61/948,167, filed on Mar. 5, 2014.

(51) Int. Cl.
| | |
|---|---|
| H04M 11/04 | (2006.01) |
| H04W 4/22 | (2009.01) |
| H04W 76/00 | (2009.01) |

(52) U.S. Cl.
CPC ........... *H04W 4/22* (2013.01); *H04W 76/007* (2013.01)

(58) Field of Classification Search
CPC ..... H04W 76/007; H04W 4/22; H04W 8/245; H04M 1/0214; B60Q 1/46; F41C 33/0227; F41C 33/0263

USPC ........ 455/404.1, 414.1, 418–420, 41.2, 41.3, 455/550.1, 90.1, 0.2, 0.3, 521; 340/5.33, 340/471, 539.1; 707/769; 224/243, 244

See application file for complete search history.

(56) References Cited

U.S. PATENT DOCUMENTS

| 5,479,149 | A  | * | 12/1995 | Pike ........................... 340/539.1 |
|---|---|---|---|---|
| 5,525,966 | A  | * | 6/1996 | Parish ......................... 340/568.1 |
| 5,598,151 | A  | * | 1/1997 | Torii, Jr. ...................... 340/5.33 |
| 5,779,114 | A  | * | 7/1998 | Owens ......................... 224/193 |
| 5,828,301 | A  | * | 10/1998 | Sanchez ...................... 340/539.1 |
| 6,415,542 | B1 | * | 7/2002 | Bates et al. .................. 42/70.11 |
| 6,641,009 | B2 | * | 11/2003 | French et al. ................ 224/244 |
| 7,168,198 | B2 | * | 1/2007 | Newkirk et al. ............. 42/70.11 |
| 7,714,720 | B2 | * | 5/2010 | Hietanen et al. ........... 340/568.1 |
| 7,944,676 | B2 | * | 5/2011 | Smith et al. .................. 361/232 |

(Continued)

*Primary Examiner* — Steve D Agosta
(74) *Attorney, Agent, or Firm* — Vista IP Law Group, LLP

(57) ABSTRACT

A system processes a series of incoming message to generate an outgoing message. In exemplary embodiments, the incoming messages comprise a first event from a wearable holster configured to accept a weapon, then receiving a second event from the wearable holster. The first signal and second signal are compared based on their respective content. The received signals derive from sensor data such as a switch, an accelerometer, a GPS sensor, a wrist device, a head device. The comparison invokes additional processing to determine the contents of a message to be sent to at least one recipient. Contents of messages are captured into a learning model, and when comparing contents of the first signal to contents of the second signal comprises the learning model is used to generate a prediction that causes an alert to be emitted.

15 Claims, 12 Drawing Sheets

(56) References Cited

U.S. PATENT DOCUMENTS

| | | | |
|---|---|---|---|
| 2002/0153396 A1* | 10/2002 | French et al. | 224/244 |
| 2009/0295560 A1* | 12/2009 | Koliopoulos | 340/471 |
| 2010/0198858 A1* | 8/2010 | Edwards et al. | 707/769 |

\* cited by examiner

AUTONOMOUS EVENT COMMUNICATION USING WEARABLE EMERGENCY RESPONDER EQUIPMENT

RELATED APPLICATIONS

The present application claims the benefit of priority to U.S. Provisional Patent Application Ser. No. 61/948,167, entitled "SMART HOLSTER", filed Mar. 5, 2014, which is hereby incorporated by reference in its entirety.

FIELD

The disclosure relates to the field of law enforcement equipment and more particularly to techniques for real-time event communication using wearable emergency responder equipment.

BACKGROUND

Law enforcement agents and other emergency responders get into difficult situations that require their full attention. In such situations, they might forget to call for backup or perform certain other critical tasks. In legacy situations, the officer uses his/her or her radio to advise a dispatcher of ongoing events. If the officer becomes incapacitated, the officer might be unable to perform certain tasks, including advising dispatch of ongoing events. Officers receive extensive training to deal with various law enforcement situations, but unfortunately many still get injured or even die in service. In fact, statistics show average officer assaults, injuries, and deaths over the past decade (2003-2012) to be increasing. Such events include 57,892 assaults per year, 15,483 injuries per year, and 154 deaths per year.

Prior solutions are not solutions at all, and rely on the officer to simultaneously perform law enforcement maneuvers while using his/her radio. In some cases, it is infeasible for an officer to "radio in". Such cases include when the officer must be silent or stealthy and/or when the officer has been injured or incapacitated.

What is needed is a way to detect events and disseminate information about those events in a manner that does not require any conscious act by the officer.

None of the aforementioned legacy approaches achieve the capabilities of the herein-disclosed techniques for real-time events communication using wearable emergency responder equipment. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for real-time events communication using wearable emergency responder equipment.

Some claims are directed to approaches for configuring a command center to receive and process signals from the wearable emergency responder equipment which claims advance the technical fields for addressing the problem of autonomous event communication and response as well as advancing peripheral technical fields. Some claims improve the functioning of multiple systems within the disclosed environments.

Some claims are directed to a system comprising a signal IO module control component for receiving incoming wireless signals from a wireless-enabled holster. The received incoming wireless signals are routed to a rule server configured to query a database to store and retrieve rules, which rules are applied over the incoming wireless signals. A predictive model is used to process the incoming wireless signals to generate real-time alerts, which alerts are in turn sent to the wireless-enabled holster.

Some claims are directed to a system comprising a signal IO module configured to receive incoming wireless signals from remote wearable wireless-enabled emergency responder equipment. The system includes a rule server configured to query a database to retrieve one or more rules, and to apply the one or more rules over the incoming wireless signals so as to invoke a predictor to process the incoming wireless signals and to generate at least one real-time alert in response to the at least one of the rules. An alerts server sends a real-time alert to at least one device of the remote wearable wireless-enabled emergency responder equipment.

Some embodiments process a series of incoming messages to generate an outgoing message. In exemplary embodiments, the incoming messages comprise a first event from a wearable holster configured to accept a weapon, then receiving a second event from the wearable holster. The first signal and second signal are compared based on their respective content. The received signals derive from sensor data such as a switch, an accelerometer, a GPS sensor, a wrist device, and a head device. The comparison invokes additional processing for determining the contents of a message to be sent to at least one recipient. Contents of messages are captured into a learning model, and when comparing contents of the first signal to contents of the second signal, the learning model is used to generate a prediction which causes an alert to be emitted.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

DETAILED DESCRIPTION

Figure 1A:
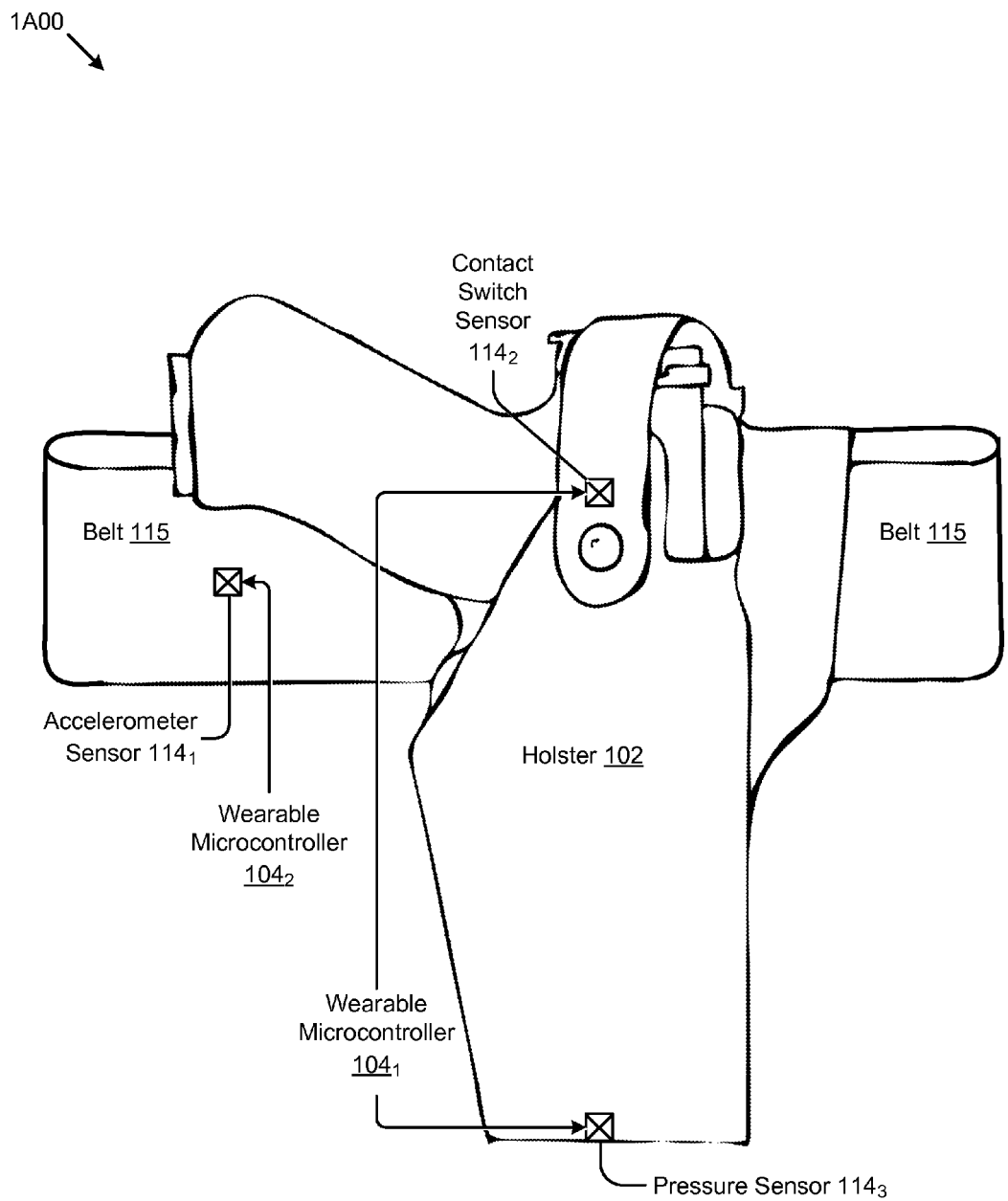
FIG. 1A is a drawing of a portion of a system for real-time event communication using wearable emergency responder equipment, according to some embodiments.

Some embodiments of the present disclosure address the problem of detecting events and disseminating information about those events in a manner that does not require any conscious act by the officer. More particularly, disclosed herein and in the accompanying figures are exemplary environments, methods, and systems for real-time event communication using wearable emergency responder equipment.

Overview

The herein-disclosed wearable emergency responder equipment (e.g., smart holster) and its peripherals (e.g., smart vest) constantly monitor the emergency responder's situation in order to record events, situations and actions. For example, when a law enforcement officer unlatches the latch of the holster, the smart holster detects this event and reports it to dispatch and/or to another repository. From there, these events can be forwarded to any number of "subscribers". For example, the officer's partner might be wearing headgear (e.g., Google Glass™), and the headgear might subscribe to the "unlatch holster" event. Upon receipt of the subscribed-to event, the headgear of the officer's partner turns on the camera within the headgear so that the situation viewed by the officer gets automatically streamed up-line and recorded. The officers do not have to take any specific actions in order for this to occur other than what they have already done (e.g., unlatch their holsters, etc.). A "central command center" component (e.g., a web application) might also subscribe to events and might display the event, any spawned events, and any streaming data, together with the officer's location (e.g., superimposed on a map that is displayed via the web application).

As an example, when the officer unholsters his/her weapon, another event gets automatically triggered and sent to the server. In this case, the nearby officers would get notified that another officer in their vicinity has unholstered his/her gun (and therefore suggests apparent and imminent danger), then their headgear would turn on and display a map with their location, along with an indication corresponding to the event and/or status that that the officer has unholstered his/her gun. Additionally, the officer's location, and possibly directions on how medical personnel can come to the aid of that officer, might be displayed to subscribers (e.g., the command center). In some situations, it is appropriate to send SMS messages to civilians in the immediate vicinity (e.g., warning them to stay out of the area where the officer has unholstered his/her gun).

As another example, an accelerometer in the holster can also detect when the officer is running (e.g., in foot pursuit) and/or if/when the officer were to happen to fall down. Again this event might trigger further events and/or actions taken in the command center (e.g., an ambulance could get dispatched to the location of the officer).

As can be seen from the above, events and messages and streaming data can be sent to subscribers—all without any intervention from any human.

Definitions

Some of the terms used in this description are defined below for easy reference. The presented terms and their respective definitions are not rigidly restricted to these definitions—a term can be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A is a drawing 1A00 of a portion of a system for real-time event communication using a smart holster. As an option, one or more instances of drawing 1A00 or any aspect thereof can be implemented in the context of the architecture and functionality of the embodiments described herein. Also, the drawing 1A00 or any aspect thereof can be implemented in any desired environment.

FIG. 1A shows a wireless-enabled holster (e.g., holster 102). As shown the holster 102 has one or more microcontrollers and one or more sensors. One or more microcontrollers can be embedded in the material of the holster (e.g., see wearable microcontroller $104_1$), or can be embedded in the material of a belt 115 (e.g., see wearable microcontroller $104_2$). The sensors can be in any number and/or located anywhere, and can be used for sensing any type of event (e.g., see accelerometer sensor $114_1$, contact switch sensor $114_2$, pressure sensor $114_3$, a temperature sensor and/or a light sensor, a heart-rate sensor, a gyroscope, or other sensor $114_N$ etc.). The sensors 114 can be disposed in or on any wearable item (e.g., a belt 115 or a flak jacket or a vest), and any sensor can communicate with and can send data to any wearable microcontroller, and the wearable microcontroller (s) can further communicate with and receive data from any sensor or second microcontroller. Data received (e.g., via an uplink) can be processed by any one or more wearable microcontrollers.

Figure 1B:
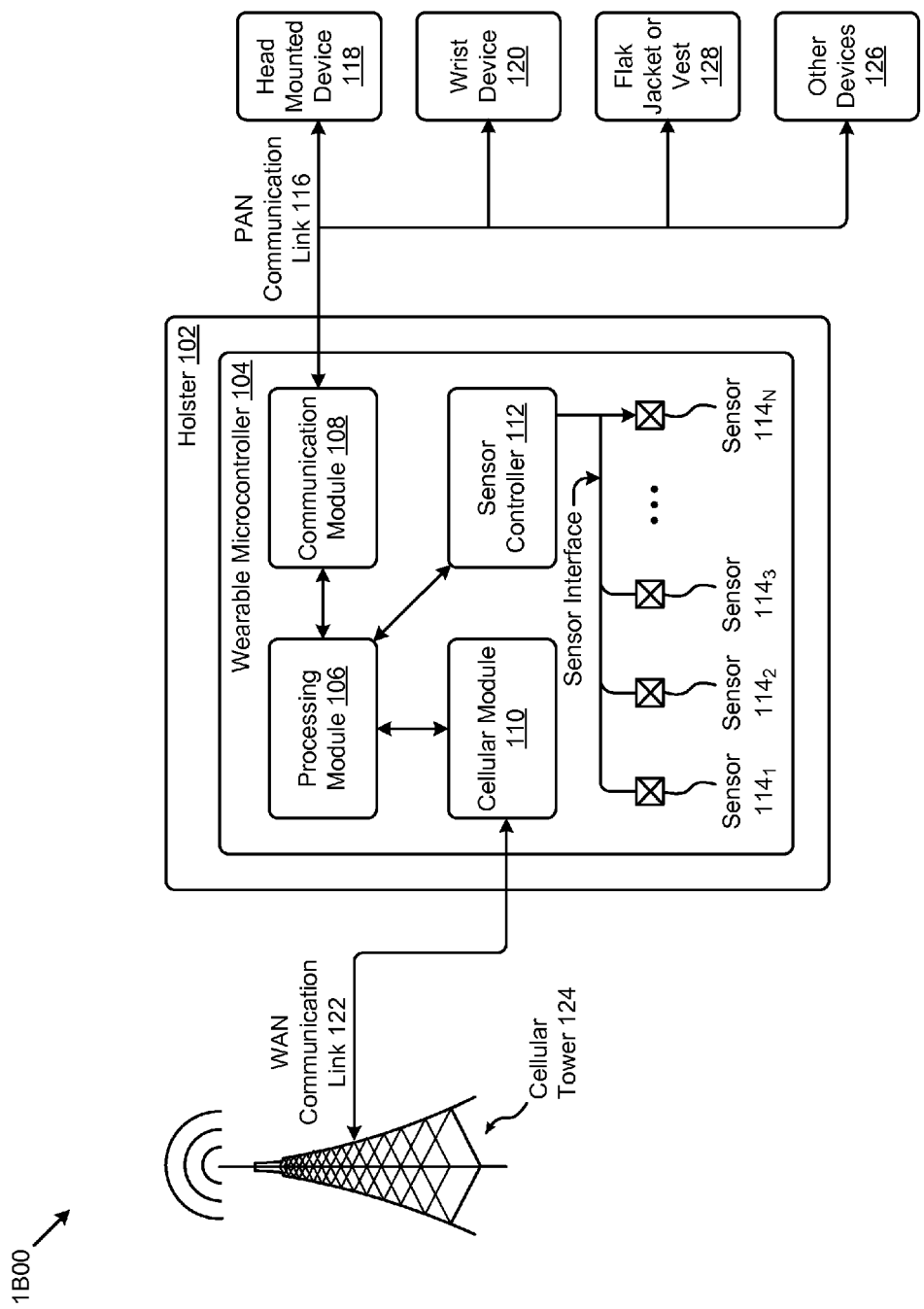
FIG. 1B is a system diagram showing a selection of interconnected components as used in a system for real-time event communication using wearable emergency responder equipment, according to some embodiments.

FIG. 1B is a system diagram 1B00 showing a selection of interconnected components as used in a system for real-time event communication using a smart holster. As an option, one or more instances of system diagram 1B00 or any aspect thereof can be implemented in the context of the architecture and functionality of the embodiments described herein. Also, the system diagram 1 B00 or any aspect thereof can be implemented in any desired environment.

FIG. 1B shows a holster system diagram. As shown, the system comprises a wearable microcontroller 104, which can detect events from sensors and facilitate communication of messages to recipients. In some embodiments the wearable microcontroller 104 includes a CPU, a communication module 108, a cellular module 110, a sensor controller 112, and a sensor 114. The processing module 106 can perform any forms of communication with a cellular module 110. The cellular module can communicate directly or indirectly with sensor controller 112. The communication module 108 can communicate over a PAN communication link 116 with any of a head mounted device 118, a wrist device 120, a flak jacket or vest 128, and any number of other devices 126 (e.g., a patrol car, a second holster, etc.). The cellular module 110 can communicate over a WAN communication link 122 with a cellular tower 124. The sensor controller 112 can communicate with and receive data from any number of a sensors 114 (e.g., a contact switch sensor, a pressure sensor, an accelerometer sensor, a temperature sensor, a light sensor, a heart-rate sensor, a gyroscope, etc.). The sensors 114 can communicate with and send data to a sensor controller 112.

TABLE 1

Exemplary uses of technology

| Technology | Function(s) |
|---|---|
| AT&T API M2X, SMS, speeds | Cellular uplink for carrying messages |
| ARM, mbed, multitech | CPU processing |
| Sparkfun sensors | Sensing environment and situation |
| Pebble | Some sensing, some display |
| Philips Hue | Display of situations in the control center |
| Native Android | Secondary peripheral, OS |
| Native Google glass and mirror API | Secondary peripheral, streaming |
| Web applications (HTML5, JS, CSS3, HAML, SCSS, JQUERY) | Displays in control center |
| Ruby/Sinatra | Ancillary support for web applications |
| Heroku for hosting | Ancillary support for web applications |
| Geolocation and Google Maps | Ancillary support for web applications |
| Twitter Bootstrap | Ancillary support for web applications and for communication of events |

Figure 1C:
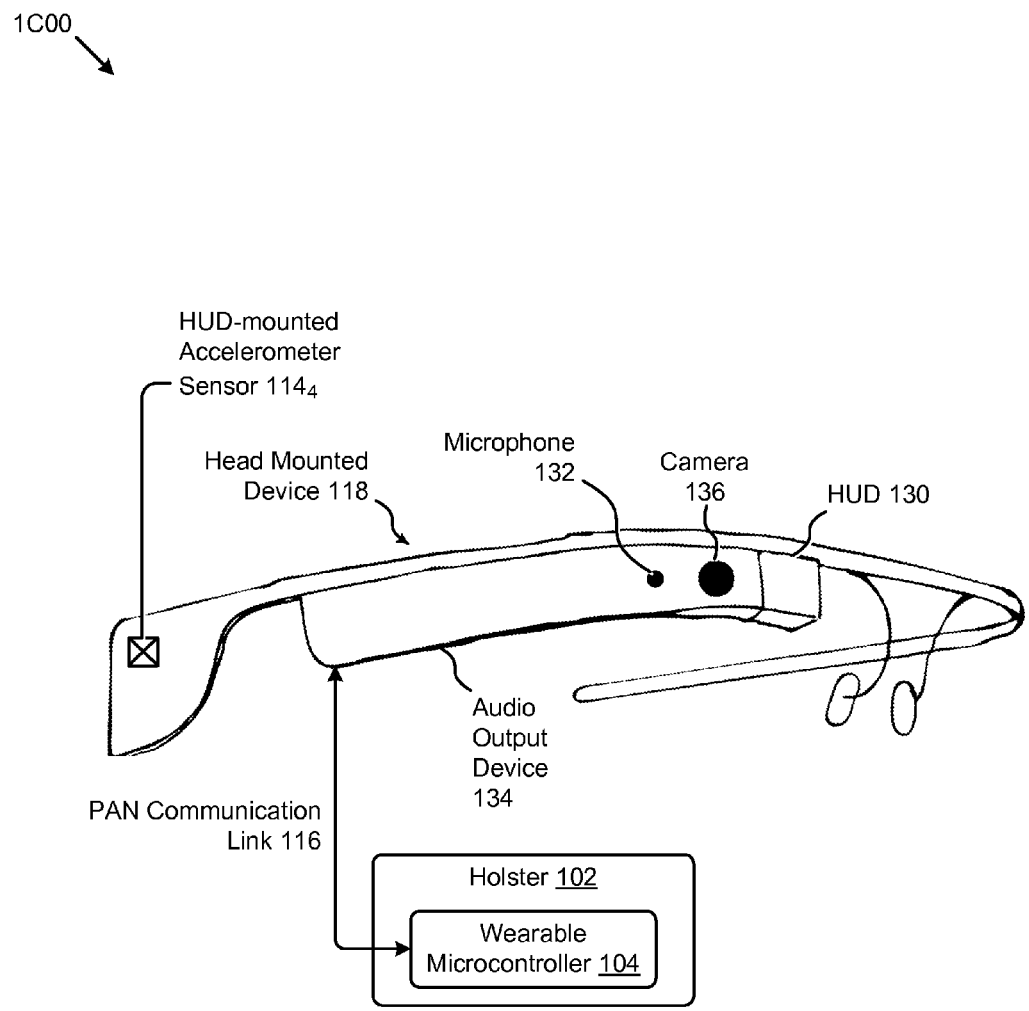
FIG. 1C is a schematic showing a head-mounted component as used in a system for real-time event communication using wearable emergency responder equipment, according to some embodiments.

FIG. 1C is a schematic 1C00 showing a head-mounted component as used in a system for real-time event communication using a smart holster. As an option, one or more instances of schematic 1C00 or any aspect thereof can be implemented in the context of the architecture and functionality of the embodiments described herein. Also, the schematic 1C00 or any aspect thereof can be implemented in any desired environment.

As shown, the system of FIG. 1C includes a head mounted device 118. The head mounted device 118 can comprise any of a camera 136, a heads-up display (HUD) 130, a microphone 132, an audio output device 134, and other devices and sensors (e.g., HUD-mounted accelerometer sensor $114_4$). The camera 136 can perform any functions pertaining to recording of video and/or taking of pictures. The HUD 130 can perform any aspect of displaying of information. The microphone 132 can perform any of a recording of sound, which may be synchronized with the camera 136. The audio output device 134 can produce sounds (e.g., beeps, clicks, speech, music, etc.). As shown, the head mounted device 118 communicates over a PAN communication link 116 with a wearable microcontroller 104, and other communication links are possible as well (e.g., in a peer-to-peer configuration).

Figure 1D:
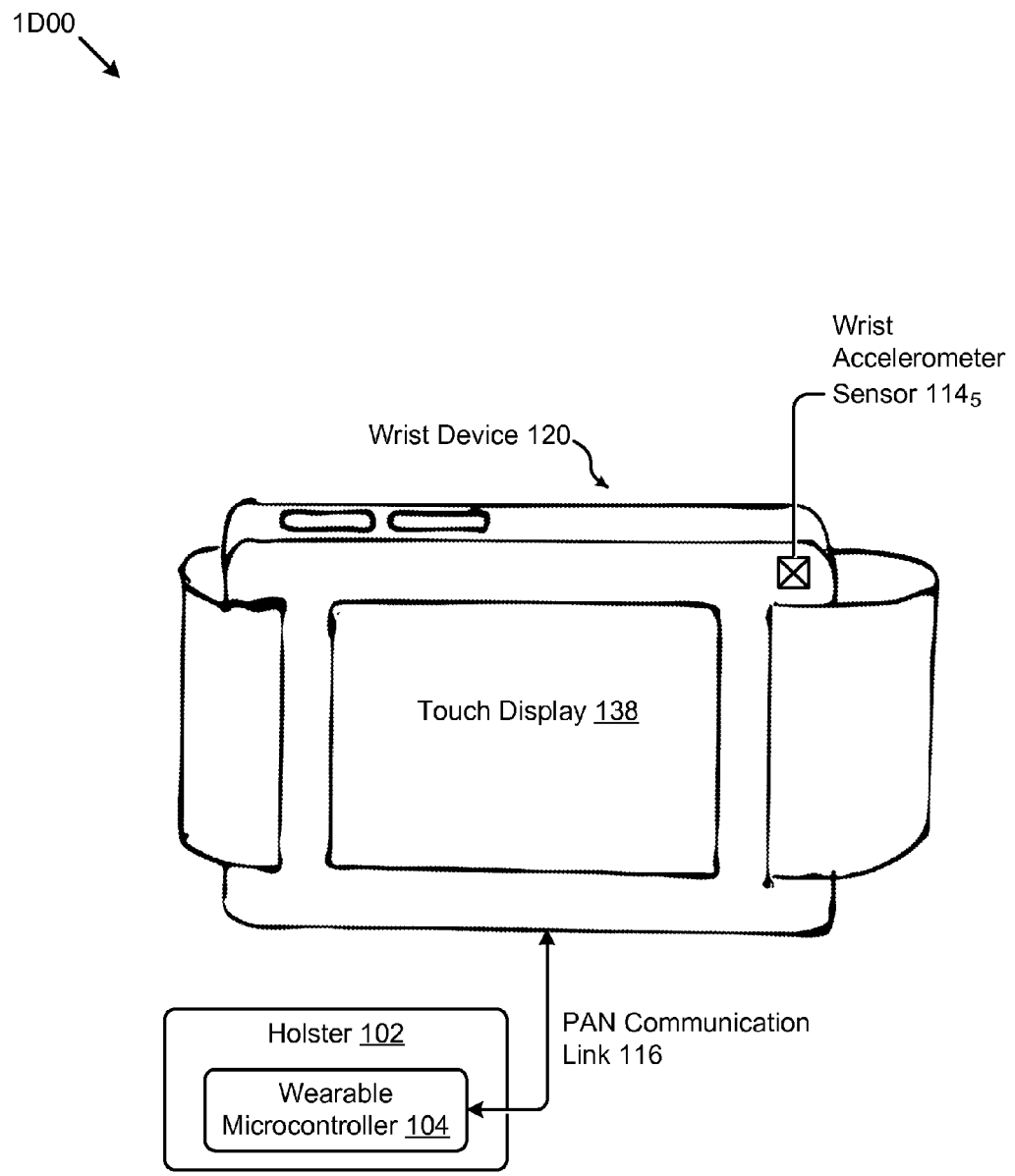
FIG. 1D is a schematic showing a wrist component as used in a system for real-time event communication using wearable emergency responder equipment, according to some embodiments.

FIG. 1D is a schematic 1D00 showing a wrist component as used in a system for real-time event communication using wearable emergency responder equipment. As an option, one or more instances of schematic 1D00 or any aspect thereof can be implemented in the context of the architecture and functionality of the embodiments described herein. Also, the schematic 1D00 or any aspect thereof can be implemented in any desired environment.

FIG. 1D shows a wrist device 120. The shown wrist device 120 comprises a touch display 138. Other embodiments have other variations of displays, and some embodiments of a wrist device include sensors (e.g., a pulse rate monitor, a body temperature monitor, an ambient temperature monitor, etc.). The touch display 138 can perform any aspect of displaying of information and receiving touch inputs. The wrist device 120 can communicate over a PAN communication link 116 with a wearable microcontroller 104, and some embodiments can be configured to communicate with other devices (e.g., over Bluetooth and/or in a personal area network).

Sensors may include sensors to detect the wearer's pulse rate, the wearer's blood pressure, and/or relative hand motions (e.g., waving) or relative hand or arm quiescence (e.g., hand in pockets or hand on steering wheel). Other situations can be detected or predicted based on a sequence of sensor data received from various wearable sensors. For example, a sequence of events from a wrist accelerometer sensor $114_5$ (and from the sensors from a head mounted device 118) might be indicative of the wearer removing or adjusting his/her head mounted device.

Figure 1E:
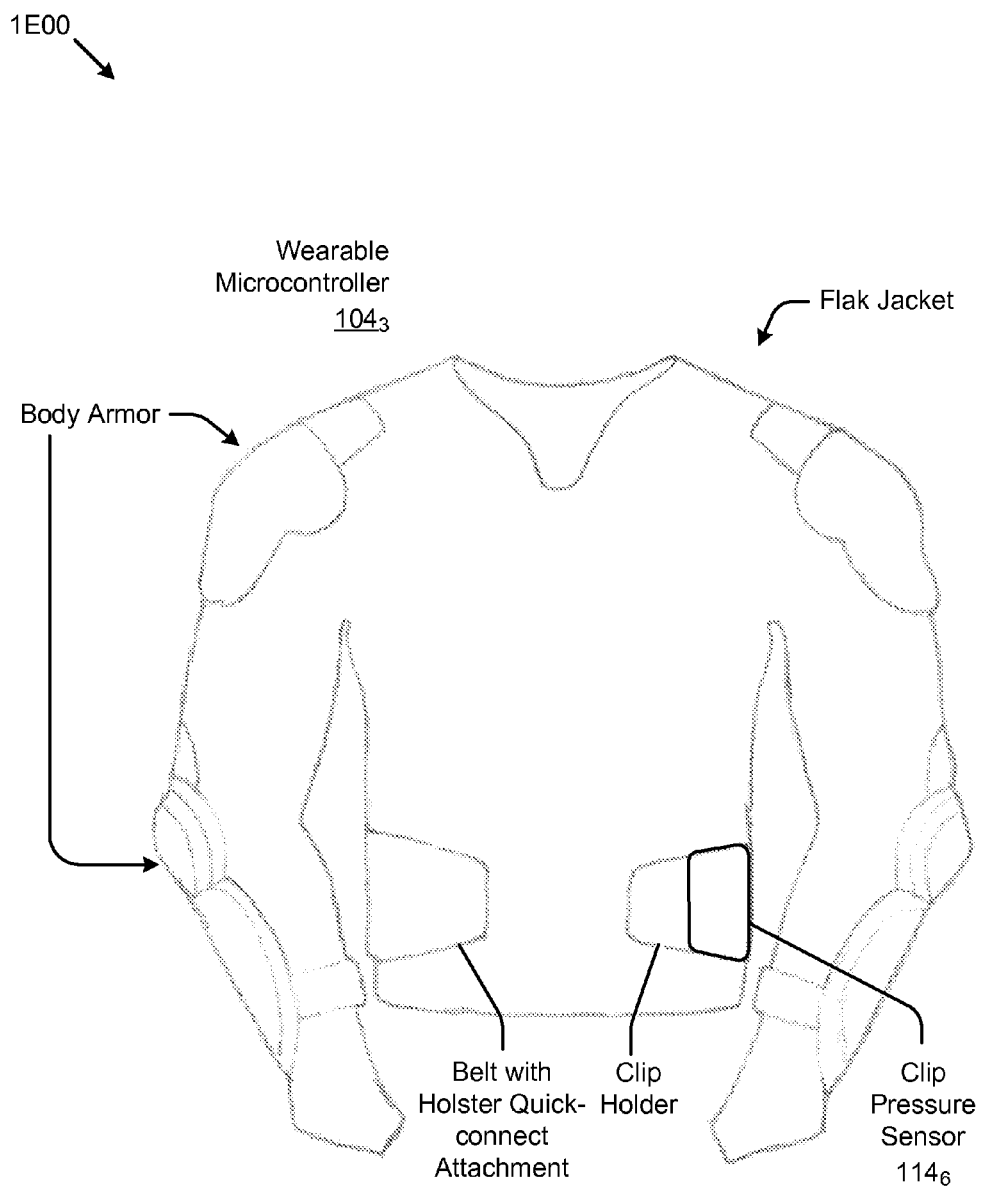
FIG. 1E is a schematic showing a flak jacket with an integrated vest as used in a system for real-time event communication using wearable emergency responder equipment, according to some embodiments.

FIG. 1E is a schematic showing a flak jacket 1E00 with an integrated vest as used in a system for real-time event communication using wearable emergency responder equipment.

Any of the aforementioned sensors can be integrated into the flak jacket or vest. For example, an accelerometer can be used to detect the physical posture of the wearer as well as detect other situations and/or events. For example, the flak jacket can be used to determine if the wearer is walking or running, at rest or laying down, etc.

The sensor data can be used singly or in combination to determine many actual situations. Further, sensor data can be used singly or in combination to determine many probable situations. Still further, the occurrence of one situation or even many situations or events in a sequence can be used as a predictor of another situation or sequence of events. For example, if an officer were to release the catch on his/her weapon (e.g., see contact switch sensor $114_2$), a model can determine within a statistical certainty that a next event would be to unholster the weapon. Or, in the case of an accelerometer on a wrist device, a model can determine within a statistical certainty if the officer is signaling via a hand wave motion.

TABLE 2

Examples of Actual Situation Sensing

| Situation | Sensors |
| --- | --- |
| Office standing | Accelerometer sensor shows downward force (e.g., of gravity) |
| Officer seated | Vest accelerometer sensor shows downward force (e.g., of gravity) and holster accelerometer shows lateral force |
| Officer down | Vest accelerometer sensor shows lateral force (e.g., of gravity) and holster accelerometer also shows lateral force |
| Weapon at-the-ready | Contact switch sensor shows weapon is unsecured |
| Weapon unholstered | Pressure sensor shows weapon has been removed from full holster insertion point |
| Clip removed from clip holder | Clip pressure sensor $114_6$ indicates clip holder is empty |
| Danger | Elevated pulse detected at wrist sensor |
| Standoff | All accelerometer sensors are quiescent, blood pressure sensor has a high reading, gun is unholstered |

Figure 2:
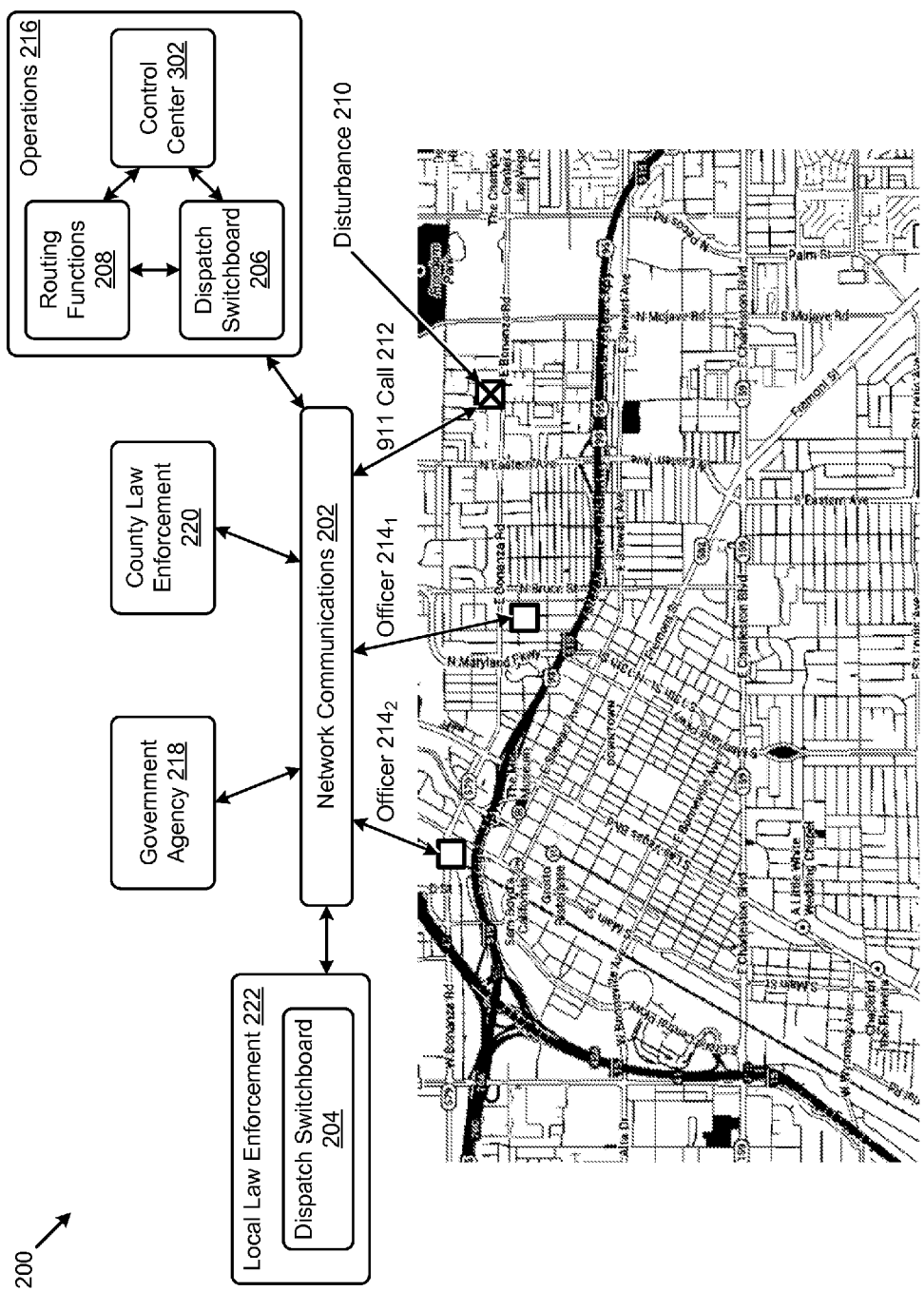
FIG. 2 is an environment in which law enforcement personnel can capture real-time event communication using wearable emergency responder equipment, according to some embodiments.

FIG. 2 is an environment 200 in which law enforcement personnel can capture real-time event communication using wearable emergency responder equipment. As an option, one or more instances of environment 200 or any aspect thereof can be implemented in the context of the architecture and functionality of the embodiments described herein. Also, the environment 200 or any aspect thereof can be implemented in any desired environment.

FIG. 2 exemplifies a usage scenario of the present disclosure. The description below is an exemplary scenario of a disturbance 210 that occurs or is reported to occur at the location shown. A "911" call 212 is placed over a network communications 202, which can include any portions of a public switched telephone network, or any other network (public or private). An operations facility and/or operational units within operations 216 receives the 911 call. A dispatch switchboard 206 dispatches an officer $214_1$ to the reported location of the disturbance 210. The officer $214_1$ is equipped with wearable emergency responder equipment (e.g., holster 102). The holster comprises any of an accelerometer and a contact switch sensor that can detect events while the officer $214_1$ is in pursuit of the perpetrator of the disturbance.

Sensors detect if/when the officer has unclipped his/her gun. If/when that occurs, the holster sends a message over network communications 202, which message describes the event. A unit within operations 216 receives the message. For example, a control center component 302 processes the message and forwards the received message and/or a second message to the dispatch switchboard 206 (e.g., the second message serving to request backup for officer $214_1$). The message can comprise of any one or more of, a location, any situational information, officer vitals, etc. In some cases, the control center component 302 sends a message to a recording unit to begin recording streams (e.g., video, audio, sensor data, etc.). Some streams can be repeated for display at the head mounted device on officer $214_1$. The dispatch switchboard 206 radios an officer $214_2$. The officer $214_2$ receives the request for back up and situational information. The officer $214_2$ responds to the request for backup, and the control center component 302 receives a message that officer $214_1$ as well as officer $214_2$ have both drawn their weapons. Lights or other indications in the control center serve to alert personnel in the control center of the severity of the events received. The control center component 302 uses routing functions 208 to forward or respond to certain messages (e.g., an officer down message might be sent to any of a local law enforcement 222, a county law enforcement 220, a government agency 218, paramedics, a local fire department, etc.). In this scenario, the local law enforcement 222 uses a dispatch switchboard 204 to communicate to a broadcast group, which communication might include instructions to dispatch backup units. Other members of the broadcast group might include a government agency 218, and might include broadcast group members (e.g., real persons or networked nodes such as a holster). Some participants in a broadcast group can serve to dispatch aid (e.g., an ambulance, paramedics, etc.).

Figure 3:
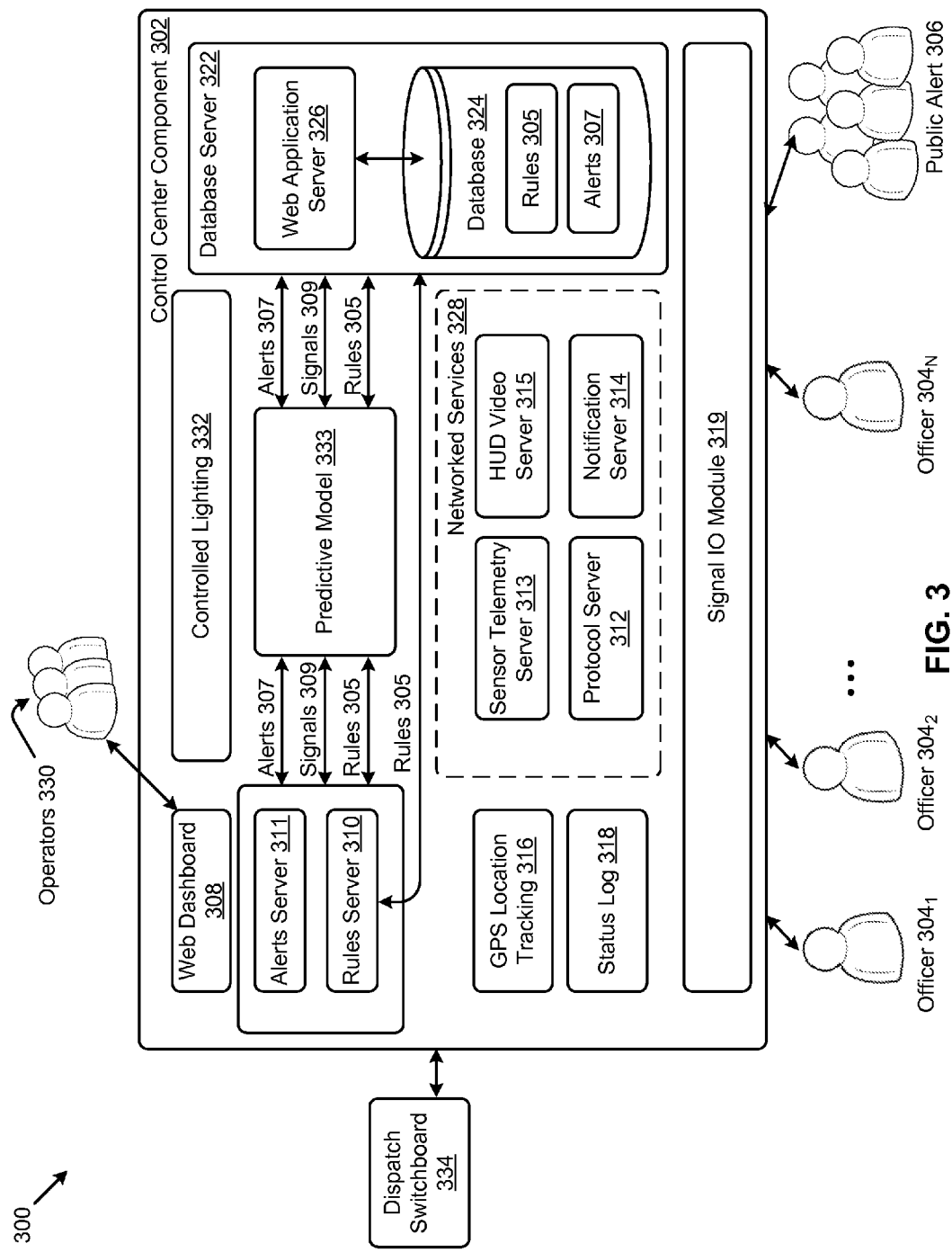
FIG. 3 is an environment in which a control center processes incoming real-time event communication using wearable emergency responder equipment, according to some embodiments.

FIG. 3 is a control center environment 300 in which a control center processes incoming real-time event communication using wearable emergency responder equipment. As an option, one or more instances of control center environment 300 or any aspect thereof can be implemented in the context of the architecture and functionality of the embodiments described herein. Also, the control center environment 300 or any aspect thereof can be implemented in any desired environment.

FIG. 3 depicts a control center component 302. As shown, the control center component includes a signal input/output module (signal IO module 319) that serves to receive any forms of real-time events (e.g., from wearable emergency responder equipment). The control center component 302 can comprise any of a web dashboard 308 (e.g., to perform displaying of information), a rules server 310 and an alerts server 311 to perform, for example, classifying of messages and routing of messages, a global positioning system (GPS) location tracking 316 to perform any of a tracking of locations by means of the global positioning system, a status log 318 to perform recording of information, an operator 330, controlled lighting 332, and networked services 328. The networked services 328 serve to provide access to services by means of a network, and can comprise any forms of application programming interfaces (APIs) such as protocol APIs (e.g., REST API), which protocols can be handled by protocol server 312 and/or a notification server 314.

The operator 330 can interact with the web dashboard 308, and upon receipt of a message or event, visual information can be provided in the form of controlled lighting 332. The controlled lighting 332 can perform changes of colors to provide visual information (e.g., yellow to indicate an escalating situation, red to indicate a severe situation, etc.).

The control center component 302 can communicate with a database server 322 to perform any of a sending, a receiving, a storing and a retrieving of information. The database server 322 can comprise any of a web application server 326 to serve web applications, and a database 324 to store information. The database server can be implemented as a single server or as a cluster of servers or computing units, and/or any portions, module or sub-components of the shown database server can be situated in a cloud (e.g., for multi-tenant hosting or private hosting) and/or any portion or portions can be hosted in a captive or private setting.

The control center component 302 can communicate with a dispatch switchboard 334 to send messages to an agency (e.g., local law enforcement, county law enforcement, a government agency, etc.) and a receiving of messages from an agency. Further, operational units in the control center component 302 can perform any forms of communication with an officer 304, for example, transmitting or relaying information between an officer $304_1$ and a second officer $304_2$, and/or transmitting or relaying information to an Nth officer $304_N$, and a sending of a public alert 306 (e.g., evacuation order, danger alert, etc.).

In certain environments, the control center component 302 hosts a number of servers that are dedicated to a particular function. For example, telemetry to and from the holster and/or any wearable devices can be handled by sensor telemetry server 313. Further, a HUD video server 315 can serve to both receive video from any number of head mounted devices and/or can deliver video to a head mounted device. Strictly as examples, HUD video server 315 can record the situation "on the ground", or the HUD video server 315 can be used to deliver video comprising the scene as experienced by an officer.

Any of the operators 330 can interact with a dashboard, and the displayed information on the dashboard might include suggestions of actions to be taken by any of the participants during the course of responding to a situation. For example, if a single officer had responded, and then found an escalating situation, it might be appropriate for the control center operators to call for backup to the situation location, even in the absence of any such instruction coming from the single officer.

Rules of engagement may be codified, and rules to be considered or applied in a particular situation can be emitted by a predictive model. Such a predictive model 333 can be constructed using a learning model, and in turn the predictive model 333 can be wrapped by a predictor (see FIG. 4) that is configured to process incoming signals. A learning model can process received signals 309 in real-time, and can learn continuously. Some embodiments include learning supervision so as to determine when to emit one or more rules 305 and/or when to raise one or more alerts 307. The shown rules server 310 and alerts server 311 might be configured so as to only apply rules that have a particular threshold of likelihood resulting in the desired outcomes, and/or have a particular threshold of likelihood of advancing the situation to a next step (e.g., where additional rules with higher likelihoods of successful outcomes can be applied). The aforementioned predictive model can be embodied as a component within a learning model system. One possible embodiment of a learning model system is given in the following FIG. 4.

Figure 4:
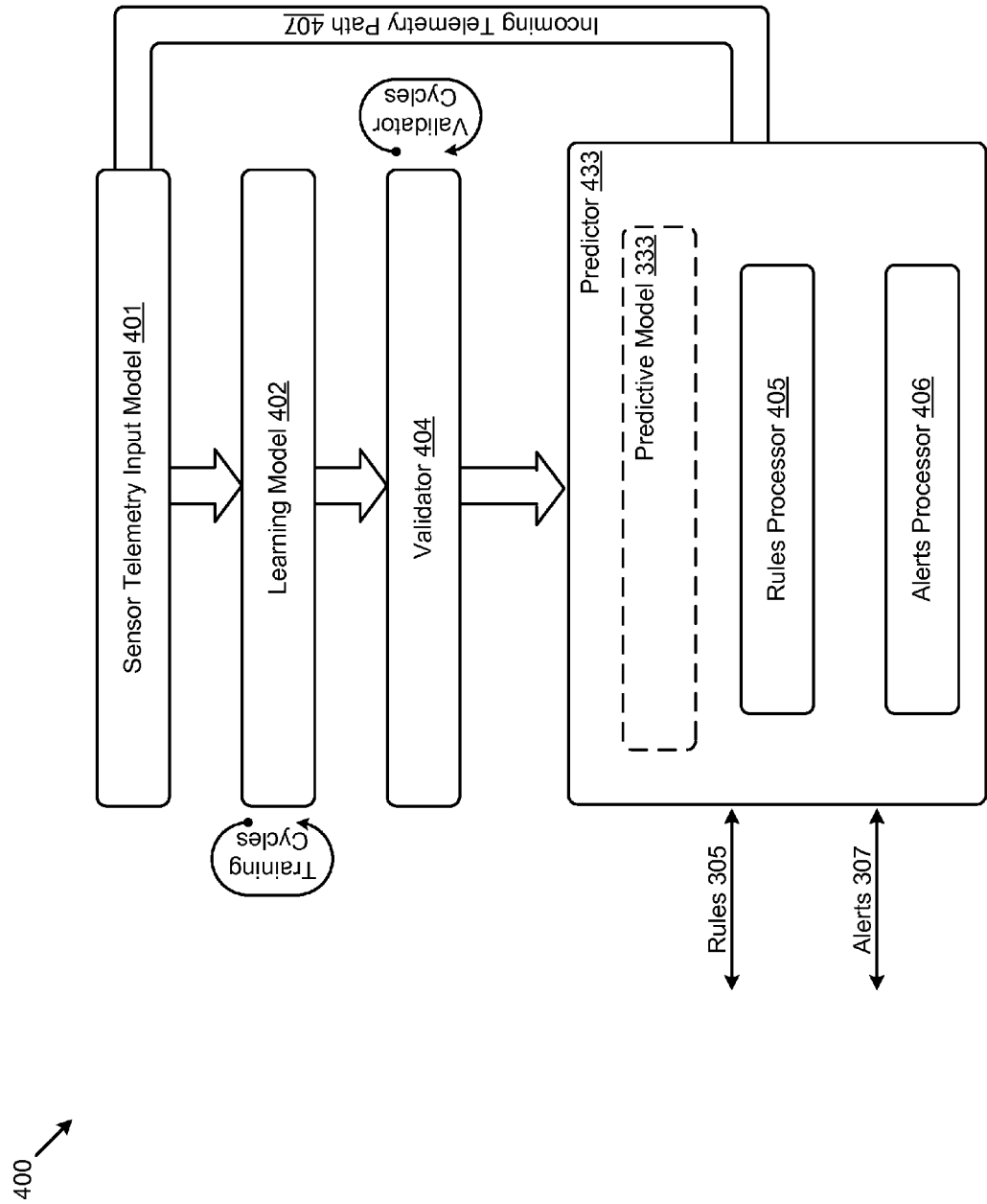
FIG. 4 depicts a learning model system including a sensor telemetry input module and a predictive model, according to some embodiments.

FIG. 4 depicts a learning model system 400 including a sensor telemetry input module and a predictor 433, according to some embodiments. The predictor 433 and its constituent predictive model 333 depicts a sample partitioning that includes a rules processor 405 and an alerts processor 406 embedded within the predictor. The rules processor 405 produces rules 305 that are ingested by the aforementioned rules server 310 and alerts server 311 which are in turn used by the system and by the operators to influence or drive a situation to a desired outcome. An example of rules include "call an ambulance in an officer down situation", or "run suspect for prior arrests when the identity of the suspect is known". Examples of alerts include "officer pulse rate elevated", or "two officers running in tandem".

In some cases the predictive model 333 can be output from a model validator 404 after such a model validator has determined that a learning model 402 exhibits sufficient quantitative characteristics (e.g., precision and recall) such that the predictions of the learning model can be relied upon to a particular statistical certainty. The learning model 402 can be populated over time, using any number of training cycles. Further, the validation of the training model and calculation of quantitative characteristics can be performed over any number of validation cycles. In some cases a predictive model receives stimulation in the form of real-time, incoming telemetry data over incoming telemetry path 407. The real-time stimulus can be used the generate a prediction within the predictive model 333 which in turn can cause a rule 305 to be emitted and/or an alert 307 to be raised.

Figure 5A:
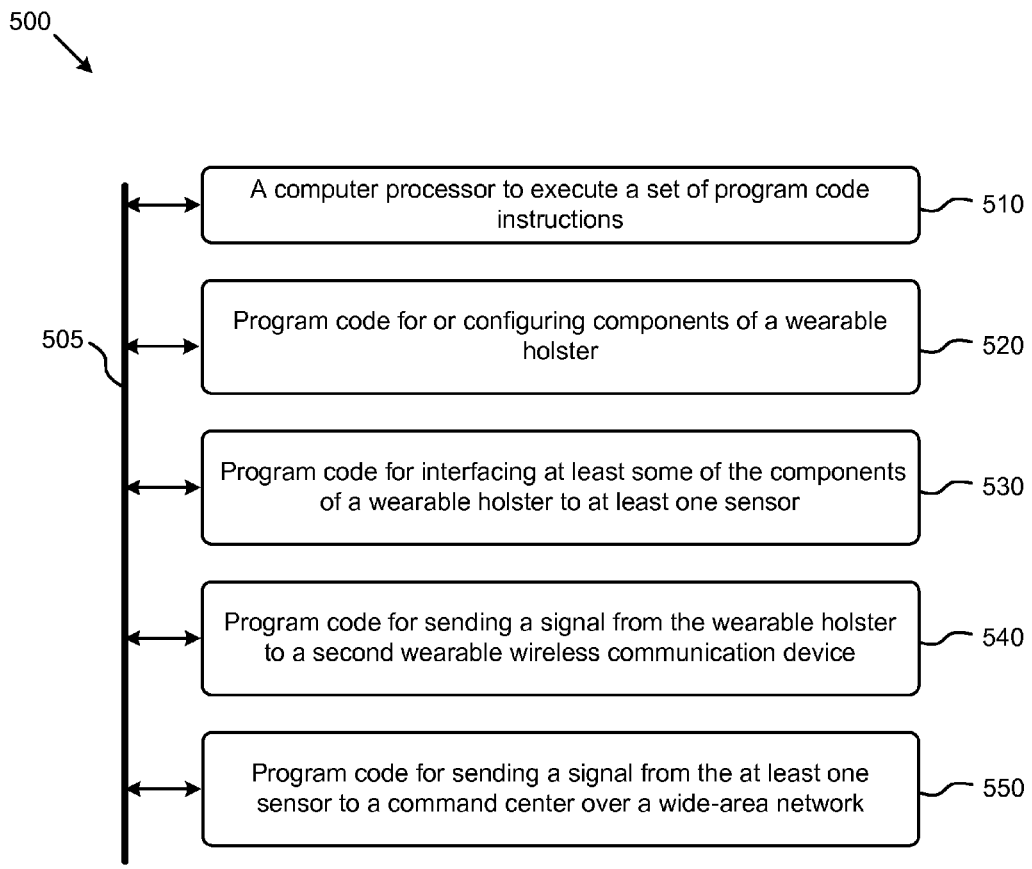
FIG. 5A is a block diagram of a system for real-time event communication using wearable emergency responder equipment, according to some embodiments.

Additional Embodiments of the Disclosure
Additional Practical Application Examples FIG. 5A is a block diagram of a system 500 for real-time event communication using wearable emergency responder equipment. The system includes, a computer processor to execute a set of program code instructions (module 510), a communication link 505, program code for configuring components of a wearable holster (module 520), program code for interfacing at least some of the components of a wearable holster to at least one sensor (module 530), program code for sending a signal from the wearable holster to a second wearable wireless communication device (module 540), and program code for sending a signal from the at least one sensor to a command center over a wide-area network (module 550).

Figure 5B:
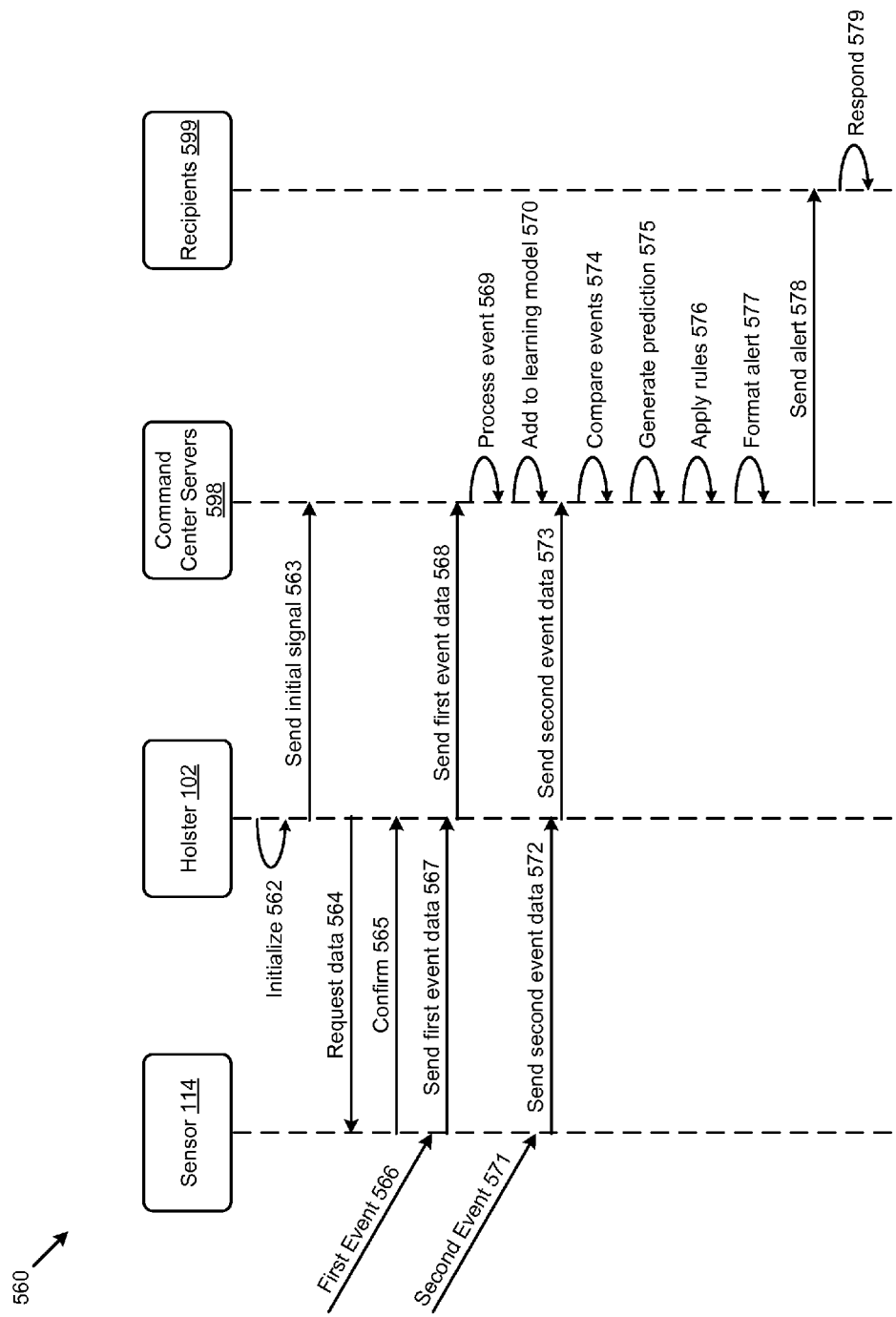
FIG. 5B is a protocol diagram of a system for real-time event communication using wearable emergency responder equipment, according to some embodiments.

FIG. 5B is a protocol diagram of a system 560 for real-time event communication using wearable emergency responder equipment. The system includes one or more sensors (e.g., a sensor 114), a smart holster (e.g., holster 102), and one or more servers (e.g., command center servers 598). Recipients are also shown in this diagram. The recipients 599 might be people, or might be machines. In this embodiment, operations of the system commence when the holster initializes itself (see operation 562) and sends an "I'm here" message to a command center server (see message 563). The holster might further initialize by requesting an interaction or data from one or more sensors (see message 564), which sensors might in turn send a confirmation message in response (see message 565).

At some moment in time, an event might occur (see event 566) and a sensor might detect the occurrence of and various aspects of the event, and forward event data to the holster (see message 567). Such a message might be relayed to a command center (as shown) or might be sent directly to a command center (see message 568). The command center server then processes the event message (see operation 569), adds the occurrence and event data to a learning model (see operation 570), compares the received event to other events (see operation 574), generates a prediction (see operation 575), applies rules (e.g., responsive to the prediction) and formats an alert (see operation 576 and operation 577). The alert might be sent to any one or more recipients (see message 578), and any one or more recipients might respond to the alert (see operation 579).

At any moment in time a second event may occur (see second event 571) and the occurrence of and data pertaining to the second event is delivered to the command center (see message 572 and message 573). In some embodiments, a particular sequence of a first event and a second event yields a high statistical confidence interval such that a prediction (see operation 575) can be acted upon (e.g., see operation 579).

Figure 5C:
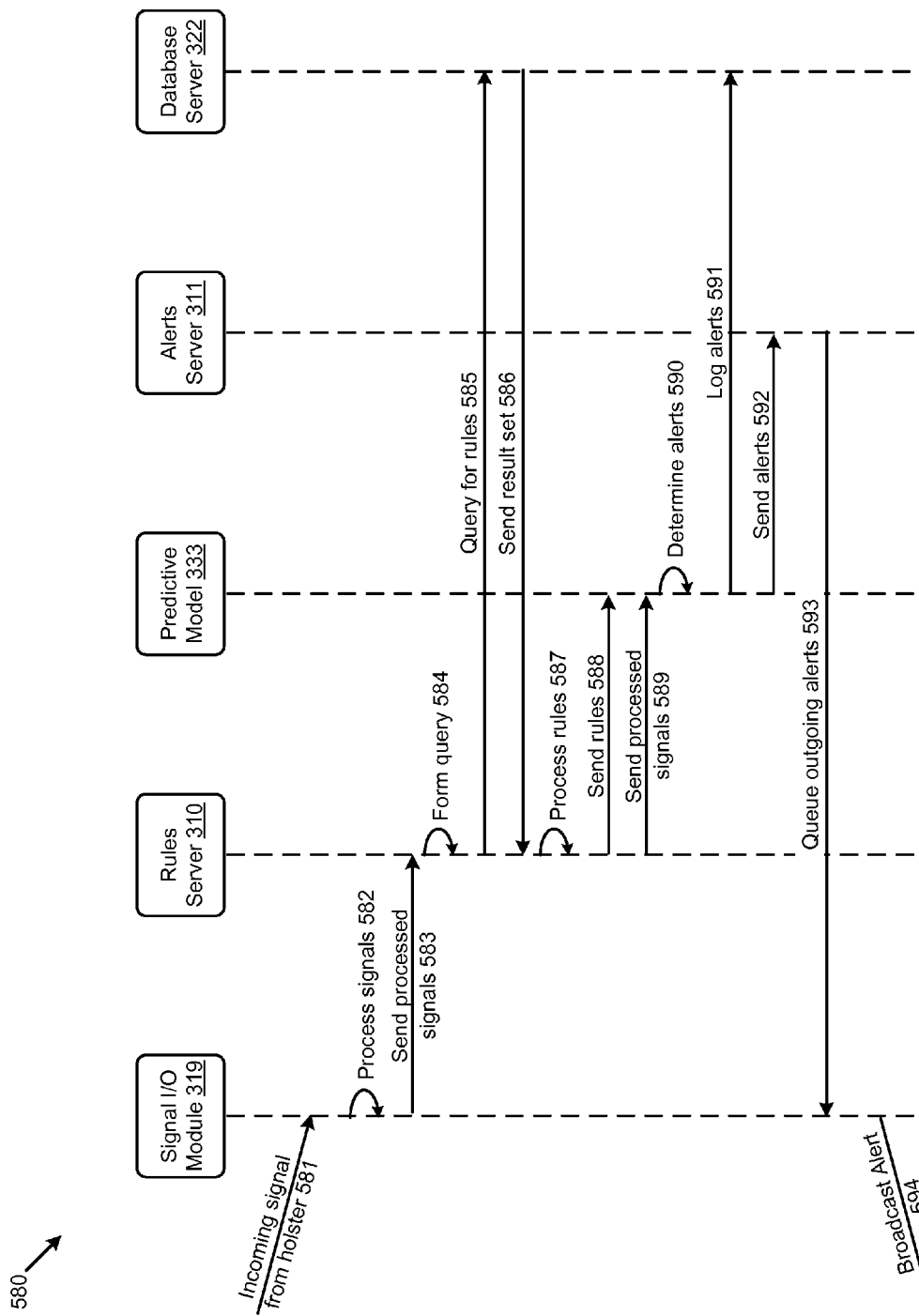
FIG. 5C is a protocol diagram of a system for real-time event communication using wearable emergency responder equipment, according to some embodiments.

FIG. 5C is a protocol diagram 580 of a system for real-time event communication using wearable emergency responder equipment, according to some embodiments. The shown protocol commences upon raising of an incoming signal from a holster (see message 581). A signal IO module 319 is configured to receive incoming wireless signals (e.g., from a wireless-enabled holster) and to process the incoming signals (see operation 582) before sending for further processing (see message 583). A rule server 310 receives processed signals from the signal IO module and the rule server forms a query (see operation 584) to query a database and retrieve rules (see message 585 and message 586). In some embodiments, the rule server (or another server) processes the retrieved rules and applies the rules over the incoming wireless signals (see operation 587) before sending processed rules to be processed by the predictive model (see message 588). The processing of rules over a signal can include without limitation determining if the signal (e.g., the event of a first officer removing a weapon from a holster) is of a nature that there are one or more actions to take. In the instant example, the act of removing a weapon from a holster is deemed sufficient to raise an alert and take an action (e.g., to advise a second officer of that event). The rule server also sends processed signals to be processed by the predictive model (see message 589). The predictive model 333 processes the incoming wireless signals using the rules, determines if one or more alerts are to be raised (see operation 590) and if so, generates real-time alerts. Real-time alerts that are raised (e.g., by operation of the predictive model) are logged to the database (see message 591), and the alerts are also sent to an alerts server (see message 592). The alerts server can process the alerts (e.g., translate text to speech) and queue the outgoing alerts to the signal IO module (see message 593). The alerts server sends real-time alerts in various forms to devices (e.g., the wireless-enabled holster), and/or to participants in a broadcast group (see message 594).

System Architecture Overview

Additional System Architecture Examples

Figure 6:
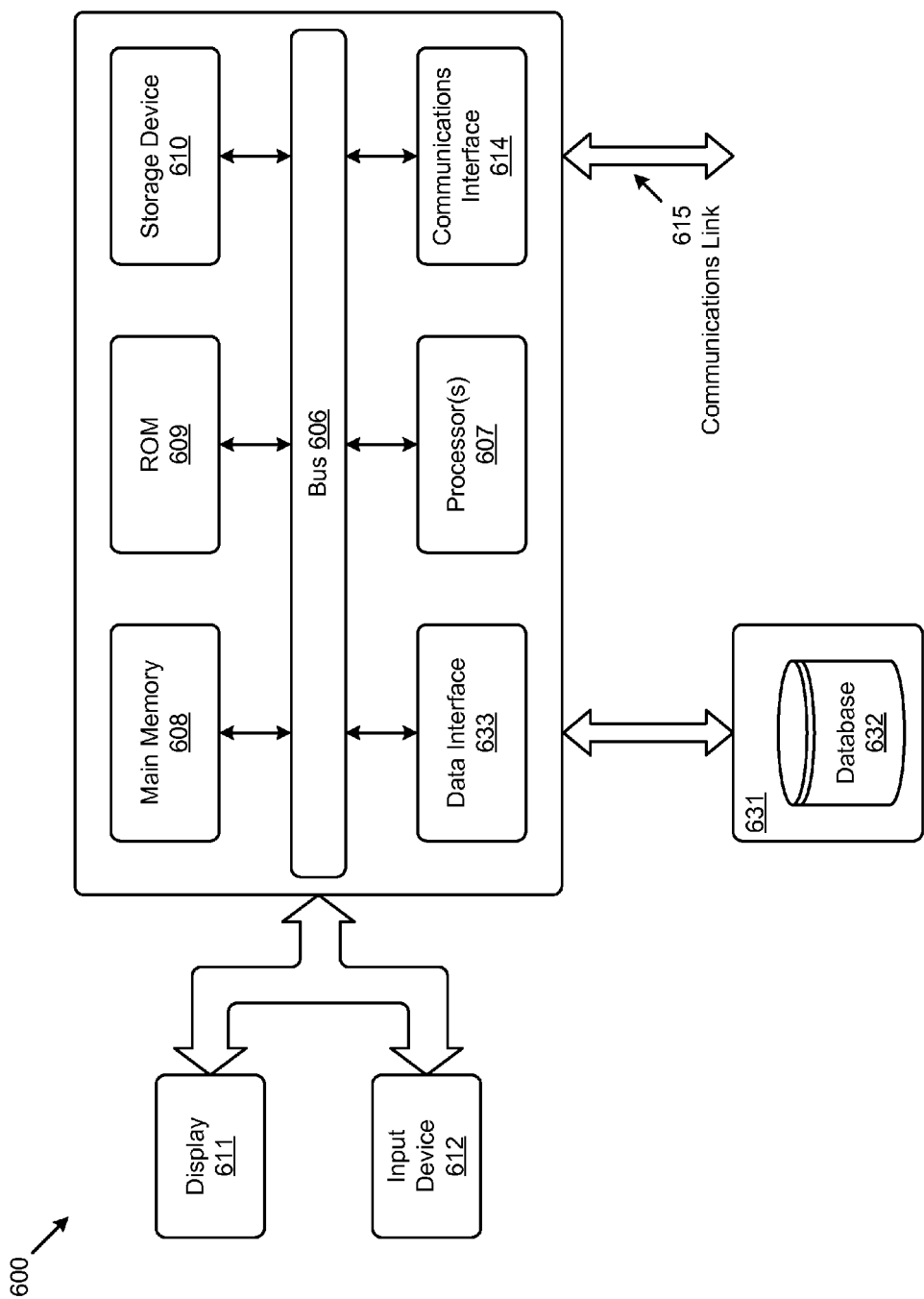
FIG. 6 depicts a diagram of an instance of a computer system suitable for implementing an embodiment of the present disclosure.

FIG. 6 depicts a block diagram of an instance of a computer system 600 suitable for implementing an embodiment of the present disclosure. Computer system 600 includes a bus 606 or other communication mechanism for communicating information, which interconnects subsystems and devices, such as a processor 607, a system memory 608 (e.g., RAM), a static storage device (e.g., ROM 609), a disk drive 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 631.

According to one embodiment of the disclosure, computer system 600 performs specific operations by processor 607 executing one or more sequences of one or more instructions contained in system memory 608. Such instructions can be read into system memory 608 from another computer readable/usable medium, such as a static storage device or a disk drive 610. In alternative embodiments, hard-wired circuitry can be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium can take many forms, including but not limited to, non-volatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to certain embodiments of the disclosure, two or more computer systems 600 coupled by a communications link 615 (e.g., LAN, PTSN, or wireless network) can perform the sequence of instructions required to practice the disclosure in coordination with one another.

Computer system 600 can transmit and receive messages, data, and instructions, including programs (e.g., application code), through communications link 615 and communication interface 614. Received program code can be executed by processor 607 as it is received and/or stored in disk drive 610 or other non-volatile storage for later execution. Computer system 600 can communicate through a data interface 633 to a database 632 on an external data repository 631. A module as used herein can be implemented using any mix of any portions of the system memory 608, and any extent of hard-wired circuitry including hard-wired circuitry embodied as a processor 607.

In the foregoing specification, the disclosure has been described with reference to specific embodiments thereof. It will, however, be evident that various modifications and changes can be made thereto without departing from the broader spirit and scope of the disclosure. For example, the above-described process flows are described with reference to a particular ordering of process actions. However, the ordering of many of the described process actions can be changed without affecting the scope or operation of the disclosure. The specification and drawings are, accordingly, to be regarded in an illustrative sense rather than in a restrictive sense.

What is claimed is:

1. A system comprising:
   a signal IO module configured to receive incoming wireless signals comprising at least one incoming wireless signal from remote wearable wireless-enabled emergency responder equipment, the incoming wireless signals corresponding to one or more messages within a communications network;
   a rule server configured to query a database to retrieve one or more rules, and to apply the one or more rules to the one or more messages corresponding to the incoming wireless signals;
   a predictor to process the one or more messages corresponding to the incoming wireless signals using at least one of the rules, and to generate at least one real-time alert in response to the at least one of the rules;
   an alerts server to send the at least one real-time alert to at least one device of the remote wearable wireless-enabled emergency responder equipment;
   the system being configured for:
      receiving, over a wireless network, a first signal from the emergency responder equipment;
      receiving, over a wireless network, a second signal from the emergency responder equipment;
      comparing first contents of the first signal to second contents of the second signal;
      determining at least one recipient of a third signal; and sending the third signal to the at least one recipient;
      wherein comparing first contents of the first signal to second contents of the second signal comprises using a predictor;

wherein the at least one recipient is at least one of, an officer, a backup unit, or an ambulance;

wherein determining at least one recipient of the third signal comprises generating a prediction;

wherein at least some of the incoming wireless signals comprise sensor data from at least one of, an accelerometer, a GPS sensor, or a pulse rate monitor;

wherein the remote wearable wireless-enabled emergency responder equipment comprises at least one of, a holster, a flak jacket, a vest, a wrist device, or a head device; and wherein the remote wearable wireless-enabled emergency responder equipment generates real-time data.

2. The system of claim 1, wherein the predictor comprises a learning model that processes the one or more messages corresponding to the incoming wireless signals in real-time.

3. The system of claim 1, wherein the one or more messages comprise data describing a location or an event.

4. The system of claim 1, wherein receiving the first signal over the wireless network includes at least one hop over a Bluetooth link.

5. The system of claim 1, wherein the prediction raises an alert.

6. A computer program product, embodied in a non-transitory computer readable medium, the computer readable medium having stored thereon a sequence of instructions which, when executed by a processor causes the processor to execute a process, the process comprising:

receiving incoming wireless signals comprising at least one incoming wireless signal from remote wearable wireless-enabled emergency responder equipment, the incoming wireless signals corresponding to one or more messages within a communications network;

querying a database to retrieve one or more rules;

processing the one or more messages corresponding to the incoming wireless signals using at least one of the rules to generate at least one real-time alert in response to the at least one of the rules;

sending the at least one real-time alert to at least one device of the remote wearable wireless-enabled emergency responder equipment;

receiving, over a wireless network, a first signal from the emergency responder equipment;

receiving, over a wireless network, a second signal from the emergency responder equipment;

comparing first contents of the first signal to second contents of the second signal;

determining at least one recipient of a third signal;

sending the third signal to the at least one recipient;

wherein comparing first contents of the first signal to second contents of the second signal comprises using a predictor;

wherein the at least one recipient is at least one of, an officer, a backup unit, or an ambulance;

wherein determining at least one recipient of the third signal comprises generating a prediction;

wherein at least some of the incoming wireless signals comprise sensor data from at least one of, an accelerometer, a GPS sensor, or a pulse rate monitor;

wherein the remote wearable wireless-enabled emergency responder equipment comprises at least one of, a holster, a flak jacket, a vest, a wrist device, or a head device; and wherein the remote wearable wireless-enabled emergency responder equipment generates real-time data.

7. The computer program product of claim 6, wherein the predictor comprises a learning model that processes the one or more messages corresponding to the incoming wireless signals in real-time.

8. The computer program product of claim 6, wherein the one or more messages comprise data describing a location or an event.

9. The computer program product of claim 6, wherein receiving the first signal over the wireless network includes at least one hop over a Bluetooth link.

10. The computer program product of claim 6, wherein the prediction raises an alert.

11. A method comprising:

receiving incoming wireless signals comprising at least one incoming wireless signal from remote wearable wireless-enabled emergency responder equipment;

querying a database to retrieve one or more rules;

processing the incoming wireless signals using at least one of the rules to generate at least one real-time alert in response to the at least one of the rules;

sending the at least one real-time alert to at least one device of the remote wearable wireless-enabled emergency responder equipment;

receiving, over a wireless network, a first signal from the emergency responder equipment;

receiving, over a wireless network, a second signal from the emergency responder equipment;

comparing first contents of the first signal to second contents of the second signal;

determining at least one recipient of a third signal;

sending the third signal to the at least one recipient;

wherein comparing first contents of the first signal to second contents of the second signal comprises using a predictor;

wherein the at least one recipient is at least one of, an officer, a backup unit, or an ambulance;

wherein determining at least one recipient of the third signal comprises generating a prediction;

wherein at least some of the incoming wireless signals comprise sensor data from at least one of, an accelerometer, a GPS sensor, or a pulse rate monitor;

wherein the remote wearable wireless-enabled emergency responder equipment comprises at least one of, a holster, a flak jacket, a vest, a wrist device, or a head device; and wherein the remote wearable wireless-enabled emergency responder equipment generates real-time data.

12. The method of claim 11, wherein the predictor comprises a learning model that processes the one or more messages corresponding to the incoming wireless signals in real-time.

13. The method of claim 11, wherein the one or more messages comprise data describing a location or an event.

14. The method of claim 11, wherein receiving the first signal over the wireless network includes at least one hop over a Bluetooth link.

15. The method of claim 11, wherein the prediction raises an alert.

* * * * *

UNITED STATES PATENT AND TRADEMARK OFFICE
CERTIFICATE OF CORRECTION

PATENT NO. : 9,602,993 B2
APPLICATION NO. : 14/476643
DATED : March 21, 2017
INVENTOR(S) : Vilrokx et al.

It is certified that error appears in the above-identified patent and that said Letters Patent is hereby corrected as shown below:

In the Specification

In Column 4, Line 64, delete "$114_N$etc.)." and insert -- $114_N$ etc.). --, therefor.

In Column 5, Line 11, delete "1 B00" and insert -- 1B00 --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*